(12) United States Patent
Bhatti et al.

(10) Patent No.: US 7,770,632 B2
(45) Date of Patent: Aug. 10, 2010

(54) THERMOSIPHON FOR LAPTOP COMPUTERS COMPRISING A BOILING CHAMBER WITH A SQUARE WAVE PARTITION

(75) Inventors: Mohinder Singh Bhatti, Amherst, NY (US); Ilya Reyzin, Williamsville, NY (US); James Alan Bright, Gasport, NY (US); Stephen Michael Vetter, Lockport, NY (US); Shrikant Mukund Joshi, Williamsville, NY (US)

(73) Assignee: Coolit Systems, Inc., Calgary (CA)

( * ) Notice: Subject to any disclaimer, the term of this patent is extended or adjusted under 35 U.S.C. 154(b) by 496 days.

(21) Appl. No.: 11/904,115

(22) Filed: Sep. 26, 2007

(65) Prior Publication Data

US 2009/0078396 A1  Mar. 26, 2009

(51) Int. Cl.
 *H05K 7/20* (2006.01)
 *F28D 15/02* (2006.01)
(52) U.S. Cl. .............................. 165/104.33; 165/104.14; 165/104.26; 361/700
(58) Field of Classification Search ............ 165/104.14, 165/104.21, 104.26, 104.33; 361/700
 See application file for complete search history.

(56) References Cited

U.S. PATENT DOCUMENTS

| | | | | |
|---|---|---|---|---|
| 3,302,042 A | * | 1/1967 | Grover et al. ........... | 165/104.26 |
| 5,660,229 A | * | 8/1997 | Lee et al. ............... | 165/104.26 |
| 6,840,311 B2 | * | 1/2005 | Ghosh et al. ........... | 165/104.33 |
| 6,899,165 B1 | * | 5/2005 | Wu ....................... | 165/104.26 |
| 7,140,422 B2 | * | 11/2006 | Malone et al. .......... | 165/104.33 |
| 7,447,029 B2 | * | 11/2008 | Lai et al. ................ | 165/104.21 |
| 2004/0035558 A1 | * | 2/2004 | Todd et al. ............. | 165/104.26 |
| 2006/0144561 A1 | * | 7/2006 | Lin et al. ............... | 165/104.33 |
| 2006/0144565 A1 | * | 7/2006 | Tsai et al. .............. | 165/104.26 |
| 2006/0144571 A1 | * | 7/2006 | Lin et al. ............... | 165/104.33 |
| 2006/0175045 A1 | * | 8/2006 | Chen ..................... | 165/104.33 |
| 2006/0278370 A1 | * | 12/2006 | Rockenfeller et al. ... | 165/104.33 |
| 2008/0302507 A1 | * | 12/2008 | Chen ..................... | 165/104.33 |

* cited by examiner

*Primary Examiner*—Leonard R Leo
(74) *Attorney, Agent, or Firm*—Arent Fox LLP

(57) ABSTRACT

The invention provides for an orientation insensitive heat exchanger assembly for cooling an electronic device comprising a hermetically sealed housing defining a boiling chamber and two condensing chambers. A partition is disposed in the boiling chamber and defines two sets of alternating channels extending in overlapping relationship to one another and with one set of alternating channels open to one of the condensing chambers and the other set of alternating channels open to the other condensing chamber for sealing the condensing chambers from one another. Coolant is maintained in each of the condensing chambers. In operation, if the thermosiphon is tilted with one side lower than the other, the channels open to the lower side are empty of coolant into the lower condensing chamber while the channels open to the opposite upper side hold the coolant over the entire boiling chamber aligning with an electronic device to continue cooling.

29 Claims, 3 Drawing Sheets

THERMOSIPHON FOR LAPTOP COMPUTERS COMPRISING A BOILING CHAMBER WITH A SQUARE WAVE PARTITION

BACKGROUND OF THE INVENTION

1. Field of the Invention

The present invention relates to an orientation insensitive heat exchanger assembly for cooling an electronic device.

2. Description of the Prior Art

The operating speed of computers is constantly being improved to create faster computers. With this comes increased heat generation and a need to effectively dissipate that heat. As laptop computers become more universal, the ability to position these heat exchangers and other parts in any one of numerous orientations becomes of greater importance.

Heat exchangers and heat sink assemblies have been used that apply natural or forced convection cooling methods to dissipate heat from electronic devices that are highly concentrated heat sources such as microprocessors and computer chips; however, air has a relatively low heat capacity. Thus, liquid-cooled units called LCUs employing a cold plate in conjunction with high heat capacity fluids have been used to remove heat from these types of heat sources. Although, LCUs are satisfactory for moderate heat flux, increasing computing speeds have required more effective heat sink assemblies.

Accordingly, thermosiphon cooling units (TCUs) have been used for cooling electronic devices having a high heat flux. A typical TCU absorbs heat generated by the electronic device by vaporizing a working fluid housed on the boiler plate of the unit. The boiling of refrigerant constitutes a phase change from liquid-to-vapor state as such the refrigerant of the TCU is considered to be a two phase fluid. Vapor generated during boiling of the refrigerant is then transferred to a condenser, where it is liquefied by the process of film condensation over the condensing surface of the TCU. The heat is rejected into a stream of air flowing over fins extending from the condenser and the condensed liquid is returned back to the boiler plate by gravity. As a result, most TCUs must be positioned in a predetermined orientation in order for the refrigerant to continue the boiling-condensing cycle, thus making the TCU orientation sensitive.

To solve this problem orientation insensitive thermosiphons, or heat exchangers, have been used. An example of a heat exchanger is U.S. Pat. No. 5,076,350 to Grantz et al. Also relevant is U.S. Pat. No. 4,550,774 Andres et al.

The '350 patent is a heat exchanger assembly including a housing for holding coolant. The housing defines a plurality of condensing chambers and a plurality of channels. These channels are hermetically sealed from the coolant disposed in the housing and do not permit coolant to flow into them, but around them.

The '774 patent is a heat exchanger assembly and discloses a housing defining a plurality of condensing chambers and channels for dissipating heat from an electronic device. The channels are mutually crossing or intersecting in at least two directions and distribute heat from an electronic device, regardless of the orientation of the heat sink.

SUMMARY OF THE INVENTION AND ADVANTAGES

The invention provides for such an orientation insensitive heat exchanger assembly for cooling an electronic device comprising a partition disposed in the boiling chamber to define two sets of alternating channels extending in overlapping relationship to one another and with one set of alternating channels open to one of the condensing chambers and the other set of alternating channels open to the other condensing chamber for sealing the condensing chambers from one another to maintain coolant in one set of alternating channels in the absence of coolant in the other set of the alternating channels. The partition seals the condensing chambers from one another and the coolant in one of the condensing chambers is independent of the coolant in the other condensing chamber.

The assembly of the present invention is suitable for operation not only in the horizontal and vertical orientations, but additionally at any angle of tilt there between.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
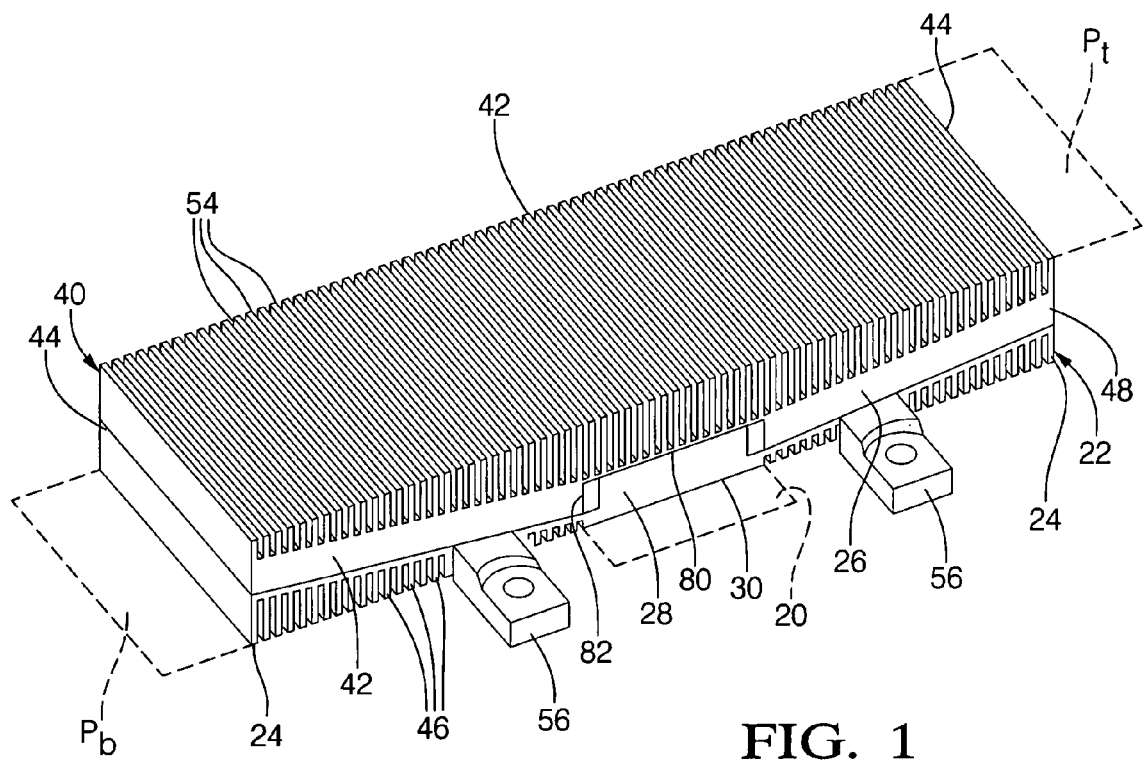
FIG. 1 is a perspective view of the thermosiphon.

Referring to the Figures, wherein like numerals indicate corresponding parts throughout the several views, an orientation insensitive heat exchanger assembly is illustrated for cooling an electronic device 20 shown in phantom in FIG. 1.

Figure 2:
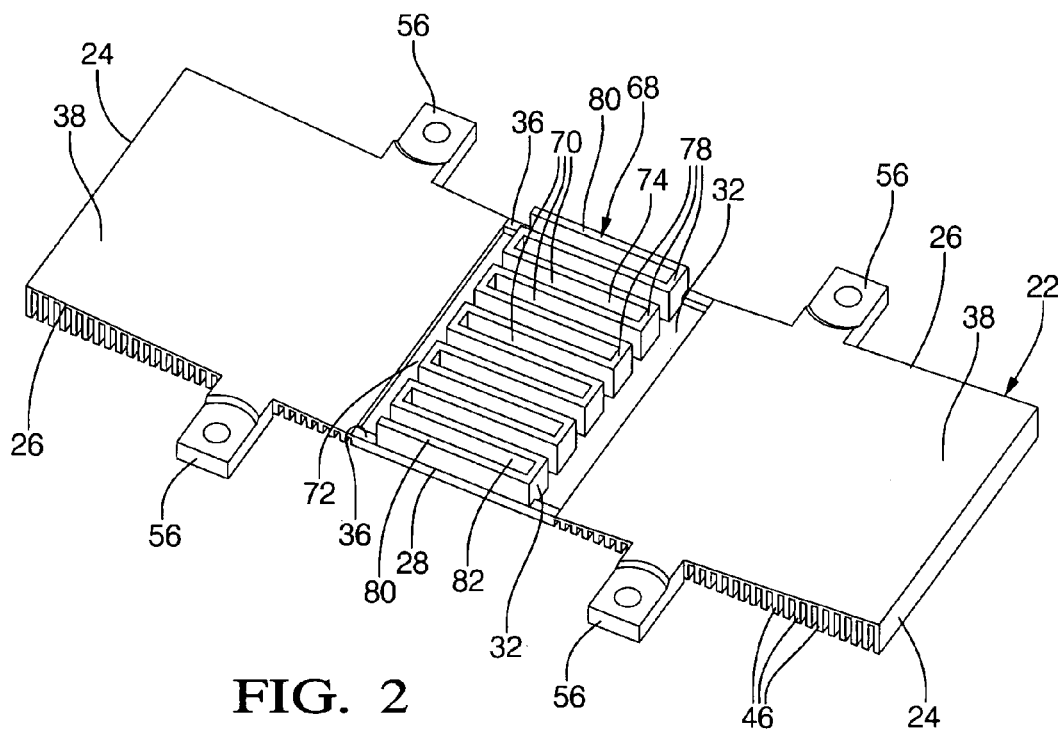
FIG. 2 is a perspective view of a portion of the thermosiphon of FIG. 1.
Figure 3:
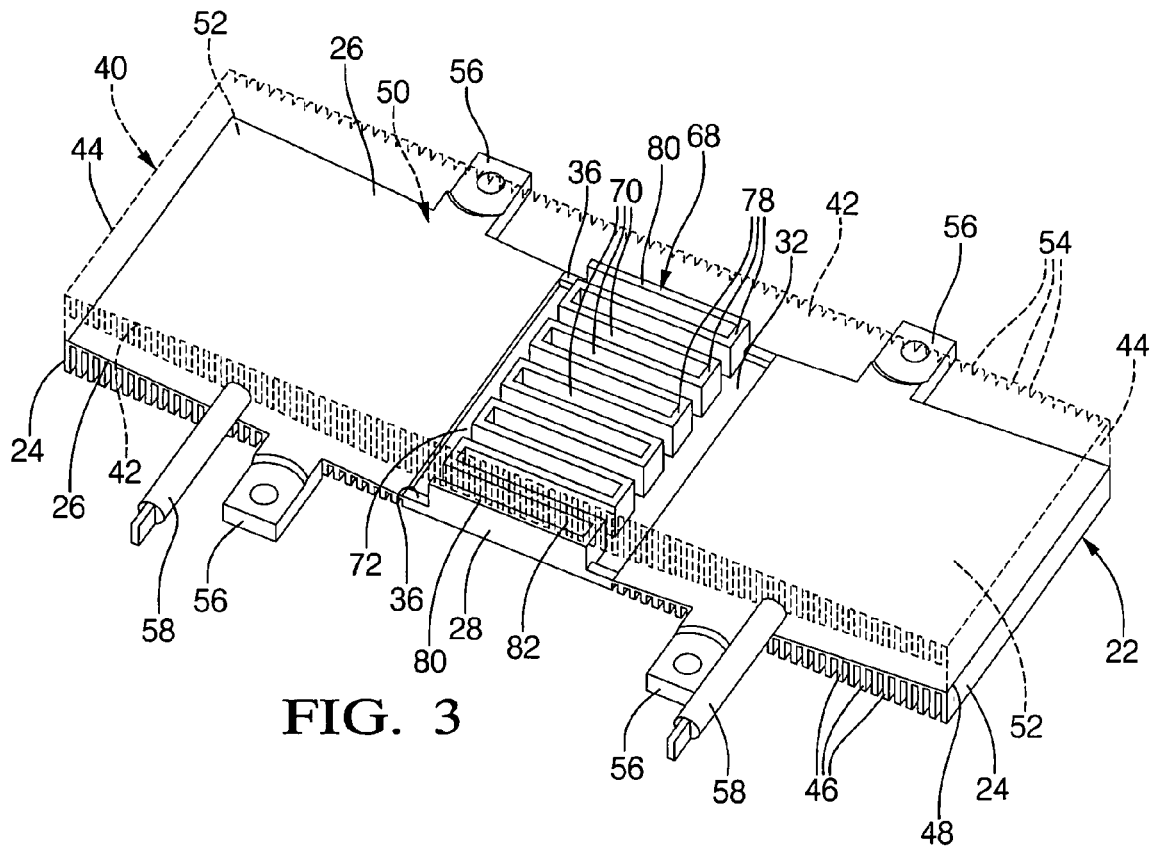
FIG. 3 is a perspective transparent view of the thermosiphon.
Figure 4:
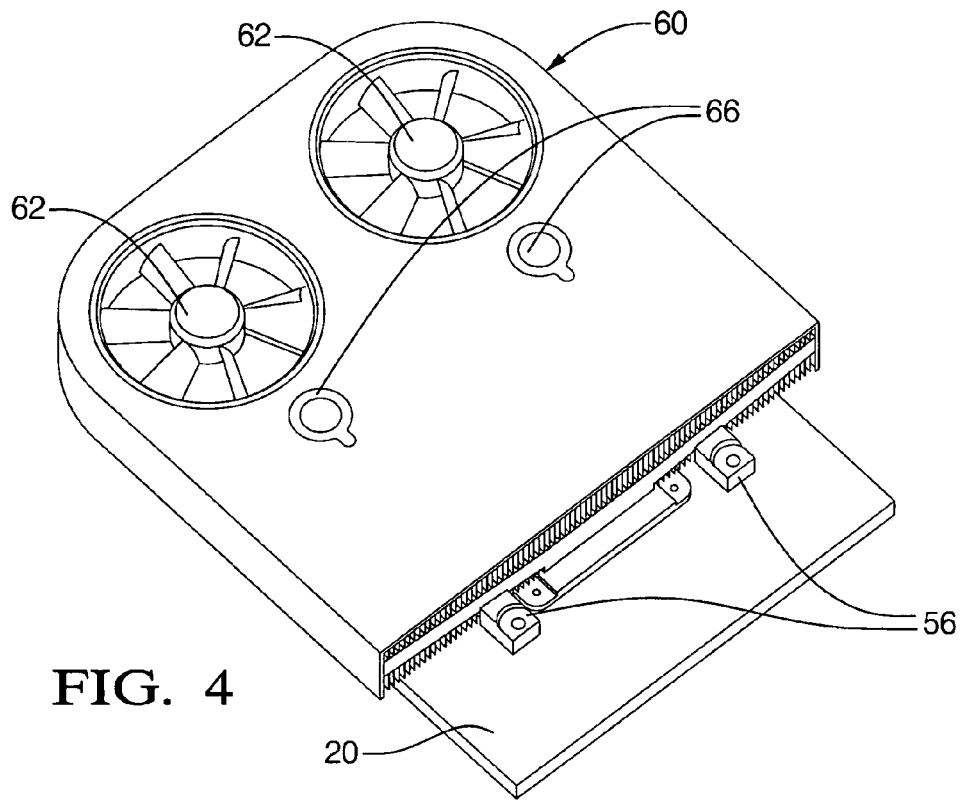
FIG. 4 is a perspective view of the embodiment.
Figure 5:
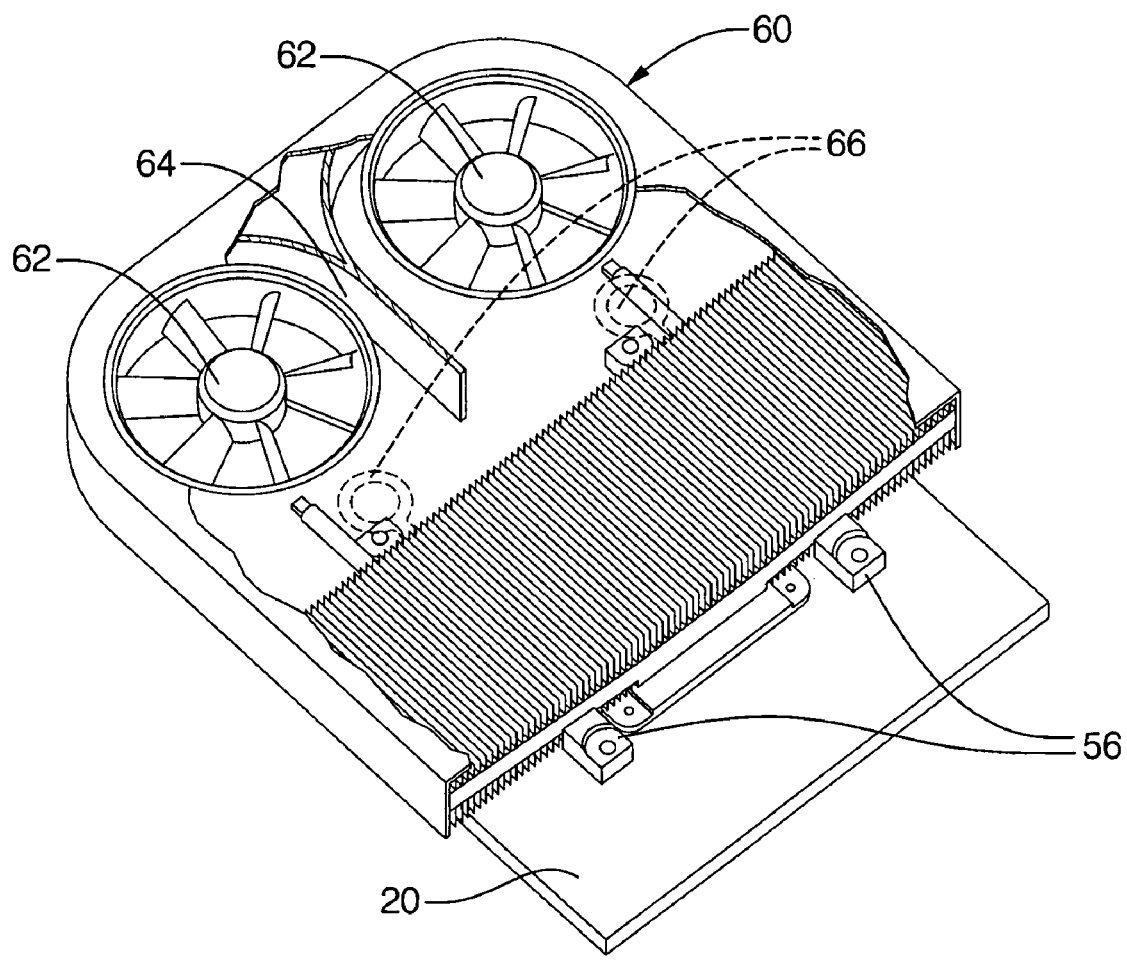
FIG. 5 is a perspective transparent view of the embodiment.

The assembly includes a bottom plate 22 having a quadratic periphery including two bottom distal ends 24 and two bottom sides 26, shown generally in FIGS. 1, 2, and 3. The bottom plate 22 (shown generally) includes a center portion 28 disposed midway between the bottom distal ends 24 and defines a bottom plane $P_b$ (shown in phantom). A boiler plate 30 is disposed underneath the center portion 28 for transmitting heat from the boiling chamber 32 and an electronic device 20, which is placed in contact with the underside of the center portion 28 of the boiler plate 30. The bottom plate 22 further defines a rectangular recess 34 disposed on the center portion 28 of the bottom plate 22 and extends adjacent the bottom sides in the bottom plate 22 to define edges 36 extending from the bottom of the recess 34 for providing a boiling chamber 32. The bottom plate 22 extends upward and outwardly from the center portion 28 to the bottom distal ends 24 for providing two opposite condensing sections 38 inclined upwardly from the boiling chamber 32 and from one another.

A top cover 40 (shown generally) has a quadratic shape and includes two top side walls 42 and two top distal walls 44 extending downward and engaging the periphery of the bottom plate 22. A plurality of parallel bottom fins 46 are disposed under the condensing sections 38 between the center portion 28 and the bottom distal ends 24 of the bottom plate 22 and extend downward to the bottom plane $P_b$. A seal 48 is disposed between the top cover 40 and the bottom plate 22 for creating a hermetically sealed housing 50 defining a condensing chamber 52 disposed over each of the condensing sections 38 and covering and extending in opposite directions from the boiling chamber 32.

A plurality of parallel top fins 54 are disposed on the top cover 40 and extend upward from the top cover 40 to a top plane $P_t$ (shown in phantom) parallel and spaced from the bottom plane $P_b$. A plurality of mounting brackets 56 extend from the bottom sides of the bottom plate 22 for mounting the thermosiphon to an electronic device 20. The top cover 40 includes a plurality of charge ports 58 for supplying liquid to the chambers 32, 52.

A fan assembly 60 has a quadratic shape and is disposed on the top fins 54 for blowing air downwardly between the top fins 54. The fan assembly 60 has a plurality of axial fans 62. An airflow divider 64 is disposed between the fans 62 for guiding airflow downward to the thermosiphon. The fan assembly 60 defines a plurality of access grommets 66 for alignment with the mounting brackets 56 for connecting the fan assembly 60 and an electronic device 20 to each of the mounting brackets 56.

The assembly is distinguished by a partition 68 (generally shown) disposed in the boiling chamber 32 to define two sets of alternating channels 70 extending in overlapping relationship to one another and with one set of alternating channels 70 open to one of the condensing chambers 52 and the other set of alternating channels 70 open to the other condensing chamber 52 for sealing the condensing chambers 52 from one another to maintain coolant 72 in one set of alternating channels 70 in the absence of coolant 72 in the other set of the alternating channels 70. The partition 68 defines a continuous serpentine path 74 to define the alternating channels 70. Further, the partition 68 includes a plurality of spaced connecting sections 76 with end sections 78 closing opposite adjacent end sections 78 of alternating ones of the connecting sections 76 to define the alternating channels 70.

The connecting sections 76 and end sections 78 are straight and connected by the end sections 78 closing adjacent end sections 78 of alternating ones of the connecting sections 76. The connecting sections 76 are parallel to each other and the end sections 78 are perpendicular to alternating ones of the connecting sections 76 to define a square wave shape.

One of the straight sections is disposed on each of the edges 36 of the bottom plate 22 along the boiling chamber 32 to define border straight sections 80. The top side walls 42 define a notch 82 disposed about and in sealing engagement with the border straight sections 80.

The invention is not limited to a square wave shape. The partition 68 defines a plurality of alternating channels 70 to allow coolant 72 to flow in between the channels 70. Further, the partition 68 could have a sinusoidal wave shape to and define the alternating channels 70. A triangle wave shape, or zigzag pattern, would also be functional so long as both sets of alternating channels 70 extend substantially across the boiling chamber 32 between the condensing chambers 52.

In operation, if the thermosiphon is tilted with one side lower than the other, the channels 70 open to the lower side are empty of coolant 72 into the lower condensing chamber 52 while the channels 70 open to the opposite upper side hold the coolant 72 over the entire boiling chamber 32 aligning with an electronic device 20 to continue cooling.

These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An orientation insensitive heat exchanger assembly for cooling an electronic devise comprising:

a hermetically sealed housing defining a boiling chamber and a pair of condensing chambers extending in opposite directions from said boiling chamber, and a partition disposed in said boiling chamber to define two sets of alternating channels extending in overlapping relationship to one another and with one set of alternating channels open to one of said condensing chambers and the other set of alternating channels open to other said condensing chamber for sealing said condensing chambers from one another to maintain coolant in one set of alternating channels in the absence of coolant in the other set of said alternating channels.

2. An assembly as set forth in claim 1 wherein said partition defines a continuous serpentine path to define said alternating channels.

3. An assembly as set forth in claim 2 wherein said partition includes a plurality of spaced connecting sections with end sections closing opposite adjacent end sections of alternating ones of said connecting sections to define said alternating channels.

4. An assembly as set forth in claim 3 wherein said connecting sections are straight and connected by said end sections closing adjacent end sections of alternating ones of said connecting sections.

5. An assembly as set forth in claim 4 wherein said end sections are straight.

6. An assembly as set forth in claim 5 wherein said spaced connecting sections are parallel to each other with said end sections closing opposite adjacent end sections of alternating ones of said connecting sections.

7. An assembly as set forth in claim 6 wherein said end sections are perpendicular to alternating ones of said connecting sections to define said alternating channels.

8. An assembly as set forth in claim 7 wherein said partition includes said straight sections with said end sections to define a square wave shape.

9. An assembly as set forth in claim 8 including a bottom plate having a quadratic periphery including two bottom distal ends and two bottom sides.

10. An assembly as set forth in claim 9 wherein said bottom plate includes a center portion disposed midway between said ends.

11. An assembly as set forth in claim 10 wherein said bottom plate defines a recess disposed on said center portion of said bottom plate and extends adjacent said sides in said bottom plate to define edges for providing said boiling chamber.

12. An assembly as set forth in claim 11 including one of said connecting sections disposed on each of said edges of said bottom plate along said boiling chamber to define border straight sections.

13. An assembly as set forth in claim 12 wherein said bottom plate extends upward and outwardly from said center portion to said distal ends for providing two opposite condensing sections inclined upwardly from said boiling chamber and from one another.

14. An assembly as set forth in claim 13 wherein said condensing chambers are disposed over each of said condensing sections and extend in opposite directions from said boiling chamber.

15. An assembly as set forth in claim 14 wherein said bottom plate defines a bottom plane.

16. An assembly as set forth in claim 15 including a plurality of parallel bottom fins disposed under said condensing sections between said center portion and said distal ends of said bottom plate and extending downward to said bottom plane.

17. An assembly as set forth in claim 15 including a top cover including two top side walls and two top distal walls extending downward and engaging said periphery of said bottom plate for providing said sealed housing.

18. An assembly as set forth in claim 17 including a seal disposed between said top cover and said bottom plate for creating said hermetically sealed housing defining said condensing chambers.

19. An assembly as set forth in claim 18 wherein said top side walls define a notch disposed about and in sealing engagement with said border straight sections.

20. An assembly as set forth in claim 17 wherein said top cover includes a plurality of charge ports for supplying liquid to each of said chambers.

21. An assembly as set forth in claim 17 including a plurality of parallel top fins disposed on said top cover and extending upward from said top cover to a top plane parallel and spaced from said bottom plane.

22. An assembly as set forth in claim 21 including a plurality of mounting brackets extending from said sides of said bottom plate for mounting said thermosiphon to an electronic device.

23. An assembly as set forth in claim 22 including a fan assembly having a quadratic shape disposed on said top fins for blowing air downwardly between said top fins.

24. An assembly as set forth in claim 23 wherein said fan assembly has a plurality of two axial fans.

25. An assembly as set forth in claim 24 including an airflow divider disposed between said fans for guiding airflow downward to said thermosiphon.

26. An assembly as set forth in claim 25 wherein said fan assembly defines a plurality of access grommets for alignment with said mounting brackets for connecting said fan assembly and an electronic device to each of said mounting brackets.

27. An assembly as set forth in claim 10 including a boiler plate disposed underneath said center portion for transmitting heat from said boiling chamber and an electronic device.

28. An assembly as set forth in claim 1 wherein said coolant is disposed in each of said sealed chambers.

29. An orientation insensitive heat exchanger assembly for cooling an electronic devise comprising:

a bottom plate having a quadratic periphery including two bottom distal ends and two bottom sides, said bottom plate including a center portion disposed midway between said bottom distal ends and defining a bottom plane, a boiler plate disposed underneath said center portion for transmitting heat from said boiling chamber and an electronic device, said bottom plate defining a rectangular recess disposed on said center portion of said bottom plate and extending adjacent said bottom sides in said bottom plate to define edges for providing a boiling chamber, said bottom plate extending upward and outwardly from said center portion to said bottom distal ends for providing two opposite condensing sections inclined upwardly from said boiling chamber and from one another, a top cover having a quadratic shape and including two top side walls and two top distal walls extending downward and engaging said periphery of said bottom plate, a plurality of parallel bottom fins disposed under said condensing sections between said center portion and said bottom distal ends of said bottom plate and extending downward to said bottom plane, a seal disposed between said top cover and said bottom plate for creating a hermetically sealed housing defining a condensing chamber disposed over each of said condensing sections and extending in opposite directions from said boiling chamber, a plurality of parallel top fins disposed on said top cover and extending upward from said top cover to a top plane parallel and spaced from said bottom plane, a plurality of mounting brackets extending from said bottom sides of said bottom plate for mounting said thermosiphon to an electronic device, said top cover including a plurality of charge ports for supplying liquid to said chambers, a fan assembly having a quadratic shape disposed on said top fins for blowing air downwardly between said top fins, said fan assembly having a plurality of two axial fans, an airflow divider disposed between said fans for guiding airflow downward to said thermosiphon, said fan assembly defining a plurality of access grommets for alignment with said mounting brackets for connecting said fan assembly and an electronic device to each of said mounting brackets, a partition disposed in said boiling chamber to define a plurality of alternating and overlapping channels open to said opposite condensing chambers and extending substantially across said boiling chamber to provide a communication between a coolant disposed in said boiling chamber and an electronic device, said partition sealing said condensing chambers from one another, said partition including a plurality of spaced straight sections with end sections closing adjacent ends of alternating ones of said straight sections to define alternating channels open to said opposite condensing chambers to seal said condensing chambers from one another, and one of said straight sections disposed on each of said edges of said bottom plate along said boiling chamber to define border straight sections, and said top side walls defining a notch disposed about and in sealing engagement with said border straight sections.

* * * * *